(12) United States Patent
Anderson et al.

(10) Patent No.: US 6,207,051 B1
(45) Date of Patent: Mar. 27, 2001

(54) FILTERED HYDRAULIC FLUID HANDLING SYSTEM

(76) Inventors: Steven D. Anderson, 215 E. Cty. Rd. B2, No. 320, St. Paul, MN (US) 55117; Kenneth R. Anderson, 5215 W. Bald Eagle Blvd., White Bear Lake, MN (US) 55110; Nancy A. Faust, 215 E. Cty. Rd. B2, No. 320, St. Paul, MN (US) 55117

( * ) Notice: Subject to any disclaimer, the term of this patent is extended or adjusted under 35 U.S.C. 154(b) by 0 days.

(21) Appl. No.: 09/263,410

(22) Filed: Mar. 5, 1999

(51) Int. Cl.[7] ................................................. B01D 24/00
(52) U.S. Cl. ...................... 210/237; 210/241; 210/416.5; 55/385.4
(58) Field of Search ................................. 210/241, 232, 210/416.1, 416.5, 167, 168, 171, 237, 244, DIG. 8, 218; 280/47.2; 55/310, 385.4

(56) References Cited

U.S. PATENT DOCUMENTS

| | | | |
|---|---|---|---|
| 2,425,848 | * 8/1947 | Vawter . | |
| 2,499,705 | * 3/1950 | Vokes | 210/241 |
| 3,394,812 | * 7/1968 | Cohen et al. | 210/241 |
| 3,473,662 | * 10/1969 | Kudlaty | 210/241 |
| 5,029,602 | * 7/1991 | McKinney et al. | 137/209 |
| 5,651,887 | * 7/1997 | Posner et al. | 210/232 |
| 5,772,871 | * 6/1998 | Lyon et al. | 210/168 |

\* cited by examiner

*Primary Examiner*—David A. Simmons
*Assistant Examiner*—Frank M. Lawrence
(74) *Attorney, Agent, or Firm*—D. L. Tschida

(57) ABSTRACT

A portable hydraulic fluid handler cart capable of transporting liquid storage containers and providing filtered fluid transfer. Quick-disconnect couplers at the cart and system adapters, along with replaceable filter cartridges, maintain fluid integrity at the system and serviced equipment. An electric motor, transfer pump, retractable extension cord and power control switch mount to the cart. Forks, rails and an adjustable clamp contain a liquid drum to the cart. A pair of handles and four wheels facilitate gripping, tipping and transport of drum containers. A kickstand stabilizes the cart when used alone. The filter media at the cart and adapters is selected to simultaneously filter liquid-borne and airborne particles and water from the fluid.

18 Claims, 5 Drawing Sheets

FILTERED HYDRAULIC FLUID HANDLING SYSTEM

BACKGROUND OF THE INVENTION

The present invention relates to hydraulic fluid handling systems and, in particular, to a portable fluid transfer cart capable of transporting a supply of hydraulic fluid and having vented, quick-disconnect transfer conduits for servicing bulk reservoirs and maintaining fluid integrity.

Numerous equipment problems can develop from contaminants present in hydraulic fluids. The problems can range from faulty equipment operation to potential destruction of costly valves, pumps and other components. Contaminants can consist of dirt particles, metal particles and shavings, sludge, and water, to name some of the typical types of contaminants that are encountered in industrial settings.

Contaminants can enter a hydraulic system and collect in the fluid over time with equipment wear or faulty seals. Contaminants can also be added into a system during periodic refilling and maintenance operations performed on the equipment. The contaminants can be added with the normal coupling and uncoupling of the transfer conduits, that is the placement of contaminated, dirt laden transfer tubes into the fluid or the attachment of dirty, threaded couplers to the bungholes of the reservoir. The contaminants can arise from improperly cleaned drum containers from which the liquids are transferred. Harmful dust particles can also be injected into the system at the vented breather mounted to the equipment reservoir.

Depending upon the type of equipment and cost, permanent filter systems can be included at the equipment to daily maintain and monitor the quality of fluids flowing through the hydraulic lines. Additionally or in the alternative, the fluids can be periodically cleaned and serviced by maintenance personnel with the aid of a portable cart that supports a transfer pump, filters and transfer conduits. A typical cart consists of a two-wheel dolly that is outfitted with a fluid catch pan, a motor driven transfer pump, one or more replaceable filters, filter manifolds and interconnecting piping. Flexible hoses, threaded couplers and tubular wands appropriately extend from the cart and mount to threaded bung holes commonly found at the equipment's fluid reservoir. A dolly, forklift or other handler is separately required to transport bulk containers (e.g. 30 to 55 gallon drums) that contain replacement fluid.

The carts can be operated in a closed-loop cycle with the equipment reservoir to filter the equipment fluid either when the equipment is shutdown or as it is being circulated through the equipment. The cart can separately circulate and clean fluids received in the bulk shipping containers, prior to adding the fluids to equipment undergoing maintenance. The cart can also be used to transfer dirty fluids from the equipment reservoir to a waste container.

As noted and instead of reducing contaminants, contaminants can be added each time the couplers, wands and hoses of the maintenance cart, which are exposed to the relatively dirty surrounding environment between use, are mounted to the equipment. The relatively large mesh size (i.e. 30 to 100 mesh) breathers used at typical equipment reservoirs can also inject dust into the fluids.

The fluid handler system of the present invention was developed to overcome the shortcomings of conventional fluid handlers. The handler provides a four-wheel cart that is capable of transporting drums of replacement fluid. The cart also supports a transfer pump and replaceable filter cartridges that simultaneously remove suspended particles and liquid contaminants. Quick-disconnect couplers and compatible vented and unvented container adapters prevent the introduction of contaminants during equipment servicing. The improved vented breather separately supports a replaceable filter cartridge that is capable of filtering micron size contaminants.

SUMMARY OF THE INVENTION

It is accordingly a primary object of the invention to provide hydraulic fluid handling equipment designed to prevent the addition of airborne and handler-borne contaminants into the treated fluid.

It is a further object of the invention to provide a multi-wheeled support cart capable of transporting a drum containing clean, replacement fluid and having a kick stand to stabilize the cart when used alone.

It is a further object of the invention to provide a support cart that is outfitted with a motor, transfer pump, filter manifold, replaceable cartridge filters containing the same or different types of filter or fluid treatment media, interconnecting conduits, extension cord and control circuitry.

It is a further object of the invention to provide reservoir couplers having quick-disconnect fittings.

It is a further object of the invention to provide vented breathers at the reservoir adapters that support replaceable filter cartridges.

Various of the foregoing objects, advantages and distinctions of the invention are obtained in one presently preferred multi-wheeled, cart handler. A tubular steel cart frame is outfitted with forks and an adjustable clamp that operate to grip a storage drum (e.g. 30 to 55 gallons). A pair of handles and four wheels are fitted to the frame to facilitate gripping and tipping a drum for stable transport on the four wheels. An electric motor and transfer pump are mounted to the cart along with a retractable extension cord and power control switch. A conduit couples the pump to a filter manifold and a pair of replaceable filter cartridges secured to the manifold. The filter media at the cartridges is selected to filter suspended particles of desired sizes and water or other liquid contaminants from the fluid during transfer.

Flexible hoses with quick-disconnect end couplers are fitted to the manifold and pump and interconnect with alternative quick-disconnect adapters that mount to the equipment reservoir being serviced. Threaded and flanged breather adapters are constructed to support replaceable cartridge filters that can filter airborne particles of a variety of sizes (e.g. >3 microns).

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

BRIEF DESCRIPTION OF THE DRAWINGS

Similar structure at the drawings is referred to with the same reference numerals and/or characters.

DESCRIPTION OF THE PREFERRED EMBODIMENT

Figure 1:
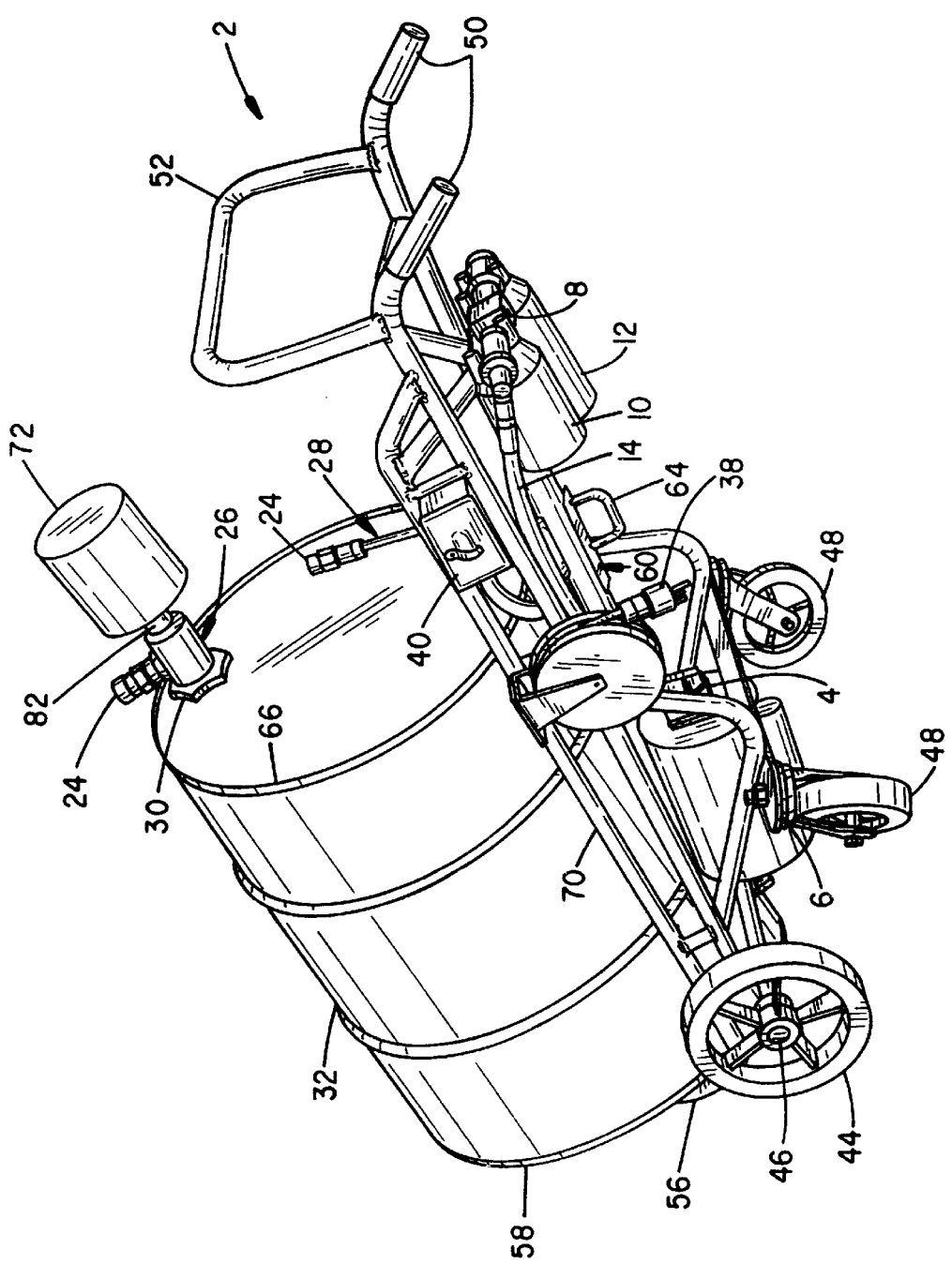
FIG. 1 is a perspective drawing of the cart handler as it appears when tipped for transport and supporting a drum containing a supply of clean or dirty, waste hydraulic fluid.
Figure 2:
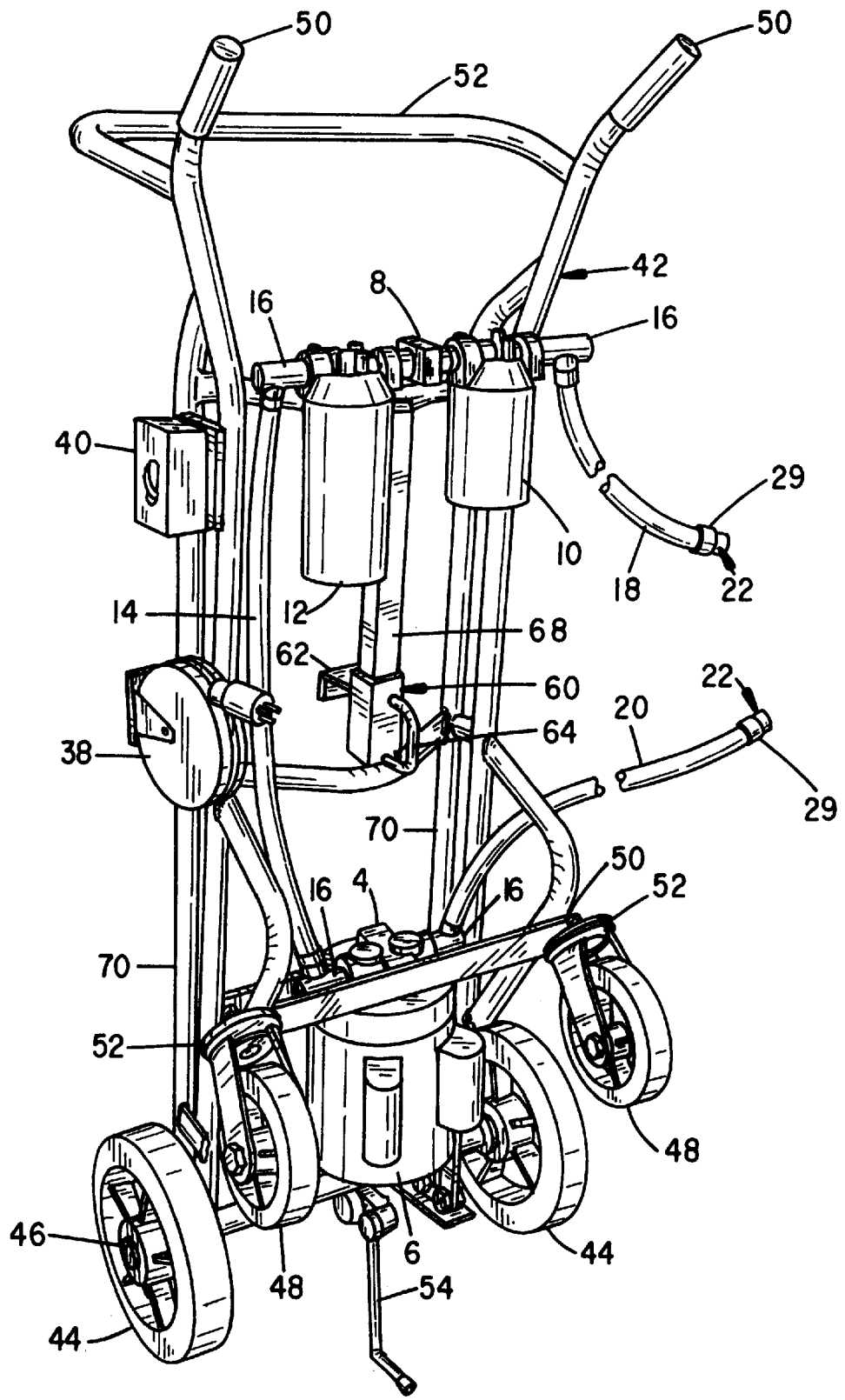
FIG. 2 is a perspective drawing showing a rear view of the cart with a kickstand lowered to stabilize the cart.

Referring to FIGS. 1 and 2, perspective drawings are shown to the hydraulic fluid handler cart 2 of the invention. The cart 2 is outfitted with a hydraulic pump 4, electric motor 6, filter manifold 8 and replaceable filter cartridges 10 and 12. The pump 4 is sized to accommodate a nominal flow rate in the range of 4 to 10 gallons per minute at a nominal operating pressure in the range of 100 to 200 pounds per square inch (psi). The motor 6 is selected to develop a nominal horsepower in the range of ¾ to 1½ hp, which is sufficient to drive the pump 4 at the rated flow. The size of the pump 4 and motor 6 can be varied as desired for particular applications.

A flexible conduit 14 couples the pump 4 to the filter manifold 8 with appropriate fittings 16. Appropriate lengths of other flexible hoses 18 and 20 (e.g. 5 to 20 feet) are coupled to the filter manifold 8 and pump 6 and terminate in conventional quick-disconnect couplers 22. The couplers 22 are machined to mate with quick-disconnect couplers 24 at the adapters 26 and 28. The adapters 26 and 28 are normally mounted to a container of clean or dirty, waste fluid or a fluid reservoir at a piece of equipment that is being serviced. O'ring seals and internal check valves (not shown) and spring biased, retractable collars 29 are provided to seal aligned flow bores 31 at the couplers 22 and 24. The couplers 22 and 24 are available from a variety of manufacturers, such as Parker-Hannifin Corp., Dynaquip Corp. or others.

Figure 4:
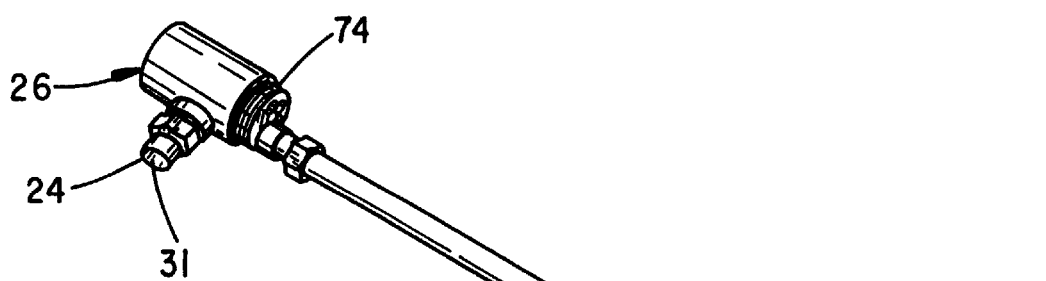
FIG. 4 is a perspective view of a threaded breather adapter with quick-disconnect coupler and down tube.
Figure 5:
FIG. 5 is a perspective view of a breather adapter having a bolted flange and a quick-disconnect coupler and down tube.
Figure 6:
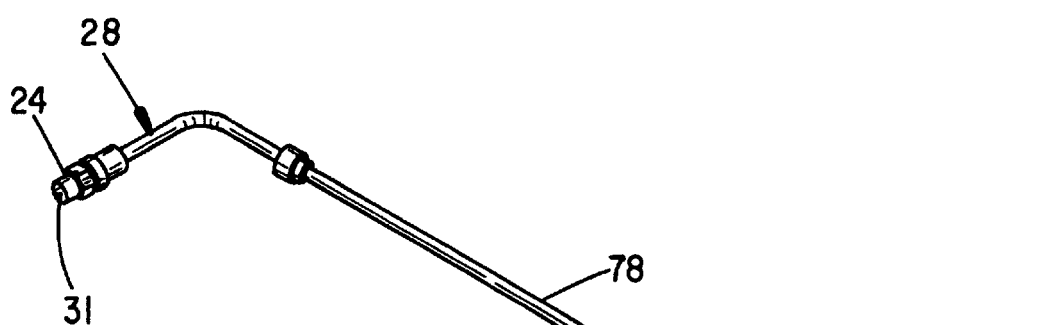
FIG. 6 is a perspective view of an un-vented threaded adapter having a quick-disconnect coupler and down tube.

Although the adapters 26 and 28 are shown attached to a storage container 32 (e.g. 30 to 55 gallon barrel or drum) that contains fluid used during servicing of the equipment, the adapters 26 and 28 are typically secured to threaded bung holes 30 at the equipment's fluid reservoir. FIGS. 4, 5 and 6 depict alternative adapters 26, 27 and 28 that can be mounted to the equipment reservoir and/or barrel 32 and are discussed in greater detail below. The adapters 26 and 28 can be secured to the drum 32 as shown during a recirculation cycle or cleaning of the replacement fluid. The adapters can also be coupled to the equipment reservoir and the drum during a pump-down or transfer of dirty fluid to the drum 32.

Figure 3:
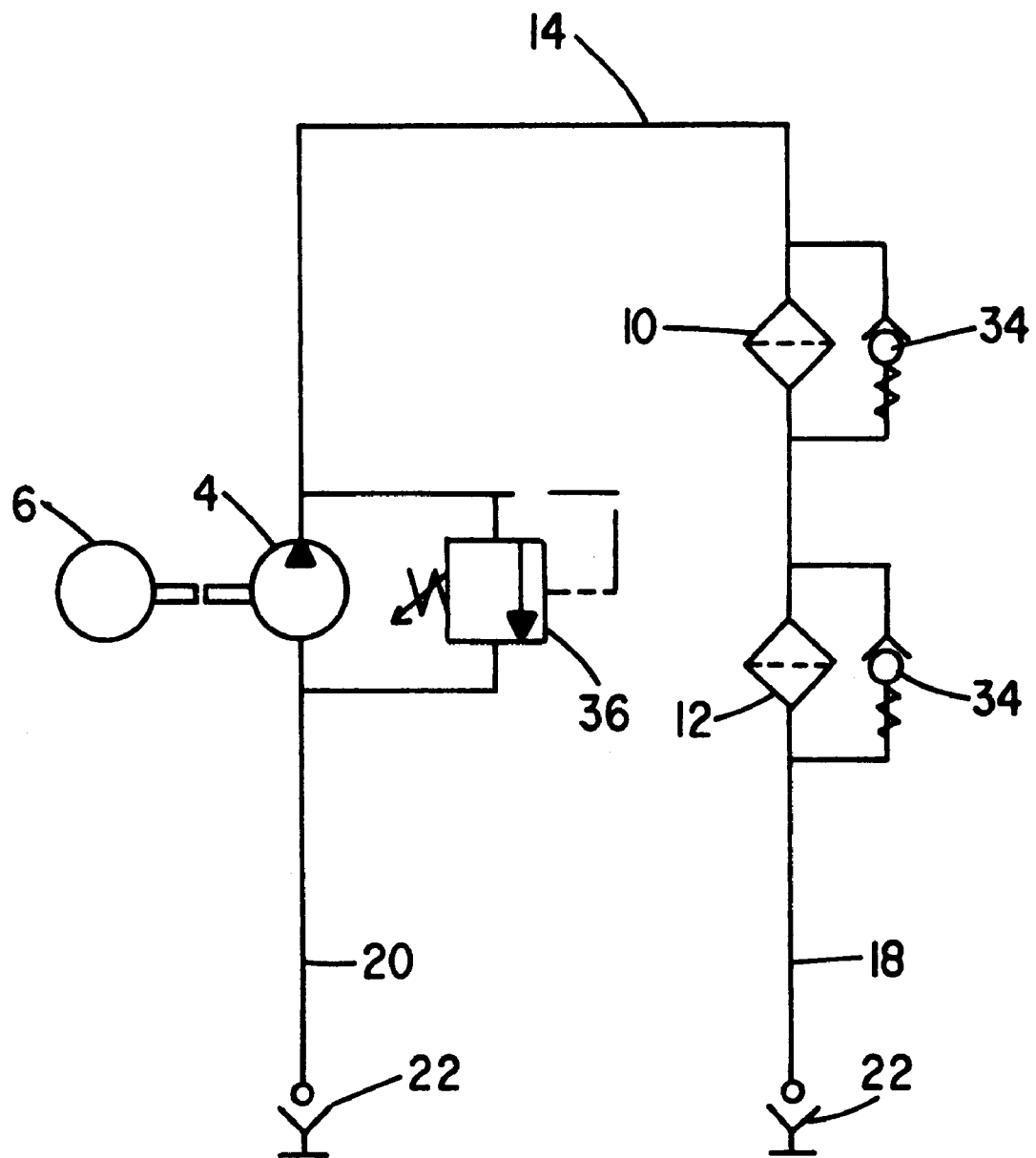
FIG. 3 is a hydraulic flow schematic of the handler system.

FIG. 3 depicts the liquid flow schematic for the handler cart 2. Conventional visual monitors and bypass valves 34 are provided at the filter manifold 8 to monitor fluid flow and confirm when the filter cartridges 10 and 12 should be replaced. The bypass valves prevent pressure buildup with a plugged filter and possible detachment of the hoses 18 and 20. A separate pressure and thermal overload 36 is provided at the pump 4. A thermal overload (not shown) is provided at the motor 6. The liquid flow at the cart 2 can be varied as desired to accommodate other flow arrangements. For example, more or less filtering can be adapted to the cart 2 using conventional parts.

The replaceable filters 10 and 12 are selected to remove both suspended particles and liquids contained in the hydraulic fluid. Commercially available handlers are constructed to filter only one or the other contaminant and typically require disassembly of a canister that contains the filter media. The process is time consuming and messy and can result in contaminants from the workplace being added to the handler system. The filters 10 and 12, in contrast, provide threaded, spin-off housings that contain a preferred media and are easily replaced without undue drainage or exposure of the handler flow path to contaminants. The type of filter media at the cart 2 can be changed by simply selecting a filter cartridge 10 or 12 containing an appropriate media.

Conveniently secured to the left side of the cart 2 is a retractable extension cord 38 and an on/off switch 40. Maintenance personnel are thereby able to conveniently position the cart 2 relative to equipment being serviced. Power is also easily disconnected for personnel safety, if necessary. Other electrical and/or hydraulic controls can similarly be fitted to the cart 2 directly or with appropriate attachment plates.

The cart 2 is constructed of a tubular metal frame 42 that is adapted to permit maintenance personnel to conveniently transport a supply of hydraulic fluid to a maintenance site without the need for separate transport equipment. Previously, it has been necessary to have a separate drum cart or forklift available to transport replacement and/or waste fluids to and from the equipment.

A pair of primary wheels 44 (e.g. 8 to 12 inch diameter pneumatic or covered solid wheels) are secured to a primary axle 46 fitted to the bottom of the frame 42. A pair of smaller, caster or dolly wheels 48 (e.g. 3 to 6 inch diameter) are secured to a cross piece 50 that projects from the back of the frame 42. Ball bearing supports 52 allow the wheels 48 to rotate freely. The dolly wheels 48 are especially helpful to stabilize the cart 2 when a drum 32 is supported to the frame 42 and tipped back onto the wheels 44 and 48. Handles 50 and 52 facilitate tipping, pulling and/or pushing the cart frame 42. A kickstand 54 assists in supporting and preventing tipping of the cart 2 during storage or when used without a barrel 32.

The barrel or drum 32 is supported to the frame 42 at a pair of forks or arms 56, only one of which is shown. The forks 56 project from the front of the frame 42. The forks 56 mate with a banded rim 58 at the bottom of the barrel 32. A slide clamp 60 having a tang 62 and handle 64 grips an upper rim band 66 of the barrel 32. The tang 62 is held to the band 66 upon being lowered along a longitudinal slide column 68. Longitudinal rails 70 project from the sides of the cart 2 and support the sides of the barrel 32. The forks 56, clamp 60 and rails 70 safely contain the barrel 32 to the cart 2 and facilitate transport of the relatively heavy, liquid filled barrels 32.

Returning attention to FIGS. 4, 5 and 6, details are shown to the adapters 26, 27 and 28. The vented, breather adapters 26 and 27 are essentially identical and are constructed to support a replaceable air filter cartridge 72, reference FIG. 2. A typical cartridge 72 is selected to filter undesired airborne particles, for example as small as 3 microns. Airborne particles can enter the system with normal changing liquid levels and the necessity to vent the equipment storage reservoir. The filter cartridge 72 provides a threaded, spin-off housing similar to the filter cartridges 10 and/or 12.

The adapter 26 includes a threaded end surface 74 that can mount to a 2-inch bunghole of an equipment storage reservoir or barrel 32. The adapter 27 differs in that it includes a flange 76 having a number of fastener holes 77 (e.g. 6 holes). The adapters 26, 27 and/or 28 can be permanently mounted to an equipment reservoir to facilitate periodic maintenance operations with the cart 2. Vent ports 80 at the bottom of the end surface 74 and flange 76 are exposed to the interior of the fluid container or equipment reservoir. Channels within the adapters extend between the ports and a threaded bore 82 to which the filter 72 is mounted.

Figure 7:
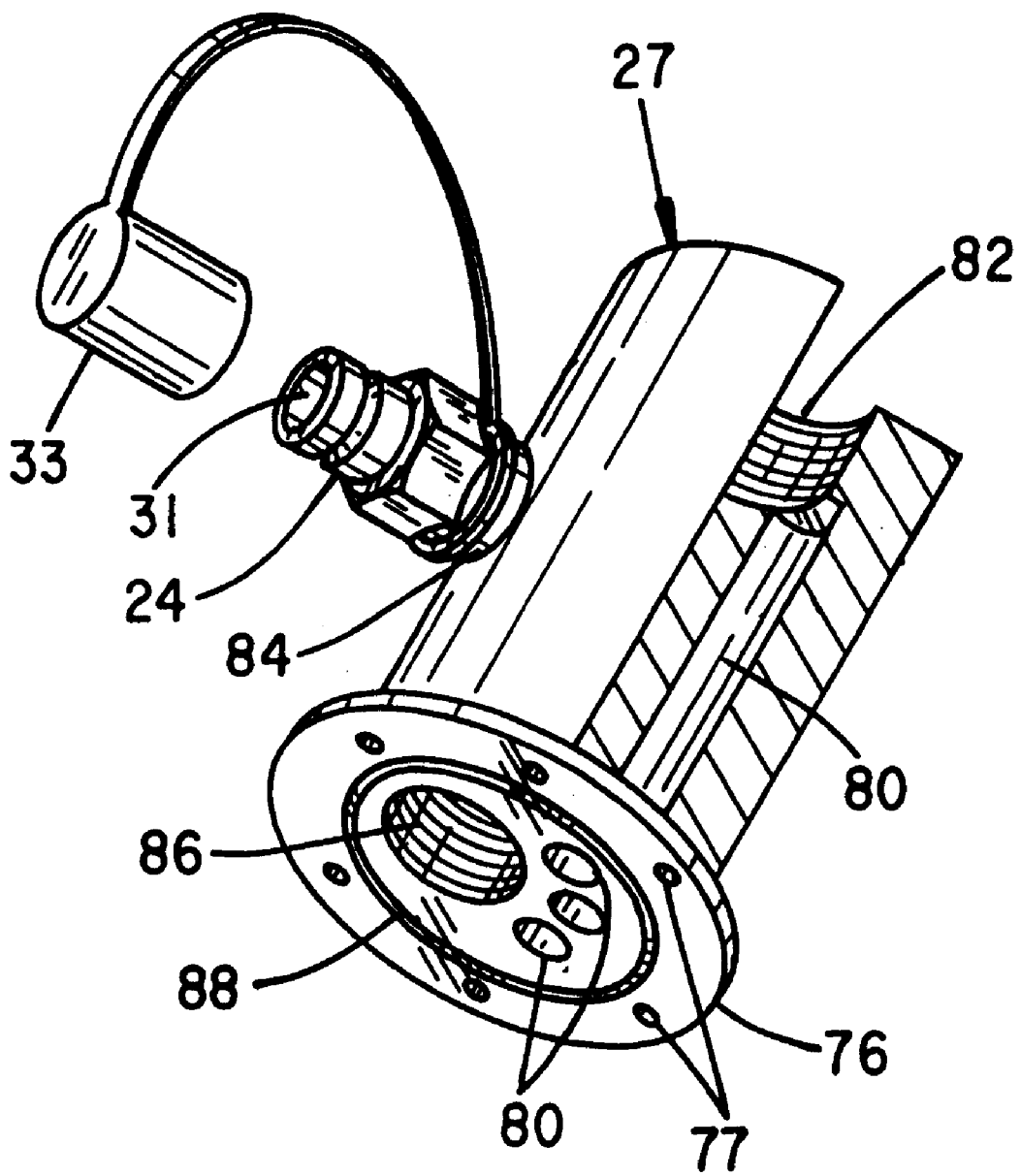
FIG. 7 is a cross section view through a vented breather adapter.

FIG. 7 shows a perspective view in partial cutaway to the adapter 27. The adapter body 84 is machined from a metal blank to provide the threaded filter-receiving bore 82. The vent ports 80 extend through the body 84 and intersect the bore 82. Threaded ports 84 and 86 are separately machined to receive a quick-disconnect coupler 24 and a down tube 78. An O'ring 88 is supported between the fastener holes 77 and the port 86 to seal the bottom of the flange 76 when mounted to a drum 32 or equipment reservoir.

The quick-disconnect couplers 24 at the adapters 26–28 conveniently assure a drip-free coupling with the mating couplers 22 at the cart 2, which was not previously possible with available adapters. The adapters 26 and 27 also support a replaceable breather media that filters smaller, micron size airborne contaminants than possible with conventional bayonet breathers. Conventional breathers typically contain a more porous media (e.g. 30 to 100 mesh).

A down tube or extension wand 78 is secured to each adapter 26–28. The length and diameter of the down tubes 78 can be varied as desired. The down tubes 78 assure that the hydraulic fluids are pumped and released below the liquid surface to reduce the potential of adding airborne contaminants to the hydraulic fluid in the equipment.

While the invention has been described with respect to a presently preferred handler system and considered modifications or alternatives thereto, still other constrictions may be suggested to those skilled in the art. Selected ones of the foregoing features can also be included alone or arranged in different combinations in other handler systems. The foregoing description should therefore be construed to include all those embodiments within the spirit and scope of the following claims.

What is claimed is:

1. Fluid handling apparatus comprising:
    a) a portable cart having a frame that includes a plurality of wheels, a motor, a pump, filter means coupled in flow communication with said pump and having first and second filters and first and second hoses respectively coupled to said pump and said filter means; and
    b) first and second adapters that mount to a liquid container, wherein each of said first and second adapters includes a coupler that interconnects to one of said first and second hoses, wherein one of said first and second adapters comprises a body having a vent bore, wherein a third filter is secured to said vent bore, wherein a plurality of channels in said body communicate with said vent bore and the interior of a liquid container, and including a fluid bore terminating in first and second ports, and wherein said coupler of said one of said first and second adapters is secured to said first port and the second port is exposed to the interior of a liquid container.

2. Fluid handling apparatus as set forth in claim 1 wherein said frame includes means for supporting a liquid container.

3. Fluid handling apparatus as set forth in claim 2 wherein said cart includes a plurality of handles for maneuvering said cart in said upright and tilted positions and a kickstand for supporting said cart in the upright position.

4. Fluid handling apparatus as set forth in claim 1 wherein said cart includes a retractable power cord and means for controlling power to said motor.

5. Fluid handling apparatus as set forth in claim 1 wherein said first and second hoses and said first and second adapters interconnect at a plurality of mating quick-disconnect couplers and wherein the mating quick disconnect couplers each include a flow bore having a check valve and means for latching the mating coupler together a spring-biased, retractable collar that aligns included flow bores at the hose and adapter couplers to secure and seal the bores in liquid tight relation to one another and wherein each flow bore includes a check valve.

6. Fluid handling apparatus as set forth in claim 1 wherein said first and second filter cartridges respectively contain filter media of differing porosity to filter suspended particles and liquid contaminants from treated fluids.

7. Fluid handling apparatus as set forth in claim 1 wherein a tubular member is secured to said second port.

8. Fluid handling apparatus as set forth in claim 1 wherein said body includes a flange having a plurality of fastener receiving holes for securing the body to a liquid container.

9. Fluid handling apparatus as set forth in claim 1 wherein said body includes a threaded surface for securing the adapter to a liquid container.

10. Fluid handling apparatus as set forth in claim 1 wherein said frame includes means for supporting a barrel to the frame and wherein said wheels are mounted to support said frame from some of said wheels in an upright position and all of said wheels in a tilted position.

11. Fluid handling apparatus comprising:
    a) a portable cart having a frame that includes a plurality of wheels, a motor, a pump, filter means coupled in flow communication with said pump and having first and second disposable filter cartridges that contain different filter media, first and second hoses respectively coupled to said pump and said filter means, and means having first and second forks and a manually manipulated tang for mounting to the rim of a liquid container drum to secure the drum to the frame, wherein first and second of said wheels are mounted to support said frame in an upright position, wherein said first and second and third and fourth wheels support said frame in a tilted position, and wherein said hoses terminate in quick-disconnect hose couplers; and
    b) first and second adapters that mount to one or more liquid containers, wherein each adapter includes a quick-disconnect adapter coupler that interconnects in fluid tight relation to one of the hose couplers, wherein one of said first and second adapters includes a vent bore, wherein a third disposable filter cartridge is secured to an external end of the vent bore, and wherein a plurality of channels in a body of said one adapter communicate with the vent bore and a portion of said one adapter that is exposed to the interior of a liquid container.

12. Fluid handling apparatus as set forth in claim 11 wherein one of each mating pair of said quick-disconnect adapter and hose couplers includes a spring-biased, retractable collar that aligns included flow bores at the hose and adapter couplers to secure and seal the bores in liquid tight relation to one another and wherein each flow bore includes a check valve.

13. Fluid handling apparatus as set forth in claim 11 wherein said first and second filter cartridges respectively filter suspended particles and liquid contaminants from treated fluids.

14. Fluid handling apparatus as set forth in claim 11 wherein said cart includes a retractable power cord and means for controlling power to said motor.

15. Fluid handling apparatus as set forth in claim 11 wherein said cart includes a plurality of handles for maneuvering said cart in said upright and tilted positions and a kickstand for supporting said cart in the upright position.

16. Fluid handling apparatus comprising:
   a) a portable cart having a frame that includes a plurality of wheels, a motor, a pump, filter means coupled in flow communication with said pump and having first and second filters and first and second hoses respectively coupled to said pump and said filter means; and
   b) first and second adapters that mount to a liquid container, wherein each of said first and second adapters includes a coupler that interconnects to one of said first and second hoses, wherein one of said first and second adapters comprises a body having a vent bore, wherein a third filter is secured to said vent bore, wherein a plurality of channels in said body communicate with said vent bore and the interior of a liquid container, and including a fluid bore terminating in first and second ports, wherein said coupler of said one of said first and second adapters is secured to said first port and wherein a tubular member extends from each of said first adapter and the second port of said second adapter to mount in the interior of a liquid container.

17. Fluid handling apparatus as set forth in claim 16 wherein said body includes a flange having a plurality of fastener receiving holes for securing the body to a liquid container.

18. Fluid handling apparatus as set forth in claim 16 wherein said body includes a threaded surface for securing the adapter to a liquid container.

* * * * *